(12) United States Patent
Chan et al.

(10) Patent No.: US 11,797,538 B2
(45) Date of Patent: Oct. 24, 2023

(54) MESSAGE CORRELATION EXTRACTION FOR MAINFRAME OPERATION

(71) Applicant: International Business Machines Corporation, Armonk, NY (US)

(72) Inventors: Yuk L. Chan, Rochester, NY (US); Jia Qi Li, Beijing (CN); Lin Yang, Beijing (CN); Tian Wu, Beijing (CN); Lei Yu, Sleepy Hollow, NY (US); Hong Min, Hopewell Junction, NY (US); Fan Jing Meng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 17/110,431

(22) Filed: Dec. 3, 2020

(65) Prior Publication Data
US 2022/0179866 A1    Jun. 9, 2022

(51) Int. Cl.
*G06F 16/24*    (2019.01)
*G06F 16/2455*    (2019.01)
(Continued)

(52) U.S. Cl.
CPC ...... *G06F 16/24553* (2019.01); *G06F 40/253* (2020.01); *G06F 40/284* (2020.01); *G06F 40/30* (2020.01)

(58) Field of Classification Search
CPC . G06F 16/24553; G06F 40/253; G06F 40/284
See application file for complete search history.

(56) References Cited

U.S. PATENT DOCUMENTS

| | | |
|---|---|---|
| 6,349,290 B1 | 2/2002 | Horowitz et al. |
| 7,506,195 B2 | 3/2009 | Takahashi et al. |

(Continued)

FOREIGN PATENT DOCUMENTS

| | | |
|---|---|---|
| CN | 101325520 B | 8/2010 |
| CN | 103761173 A | 4/2014 |

(Continued)

OTHER PUBLICATIONS

Metric Pair Log Frequency Correlation—Google Scholar/Patents search—text refined (year: 2022).

(Continued)

*Primary Examiner* — Loc Tran
(74) *Attorney, Agent, or Firm* — CANTOR COLBURN LLP; Teddi Maranzano

(57) ABSTRACT

Aspects of the invention include computer systems, computer-implemented methods, and computer program products configured to perform message correlation extraction for mainframe operation. A non-limiting example computer-implemented method includes receiving a first message log entry having a message identifier and message field data. The first message log entry is pre-processed to determine the message identifier and to tokenize the message field data. A second message log entry is identified based on at least one of the message identifier and the tokenized message field data. The method further includes determining that the second message log entry is correlated with the first message log entry and providing an output comprising the message correlation between the first message log entry and the second message log entry.

20 Claims, 10 Drawing Sheets

(51) Int. Cl.
*G06F 40/253* (2020.01)
*G06F 40/284* (2020.01)
*G06F 40/30* (2020.01)

(56) References Cited

U.S. PATENT DOCUMENTS

| | | | |
|---|---|---|---|
| 7,742,875 | B2 | 6/2010 | Li et al. |
| 7,856,575 | B2 | 12/2010 | Bock et al. |
| 7,860,815 | B1 | 12/2010 | Tangirala |
| 8,065,336 | B2 | 11/2011 | Armstrong et al. |
| 8,229,953 | B2 | 7/2012 | Kapuram et al. |
| 8,495,429 | B2 | 7/2013 | Fu et al. |
| 9,086,944 | B2 | 7/2015 | Lentile et al. |
| 9,164,983 | B2 | 10/2015 | Liu et al. |
| 9,215,164 | B2 | 12/2015 | Scharf et al. |
| 9,225,730 | B1 | 12/2015 | Brezinski |
| 9,244,755 | B2 | 1/2016 | Huang et al. |
| 9,298,453 | B2 | 3/2016 | Vangala et al. |
| 9,354,961 | B2 | 5/2016 | Nagura et al. |
| 9,367,809 | B2 | 6/2016 | Puri et al. |
| 9,413,837 | B2 | 8/2016 | Vaccari et al. |
| 9,633,106 | B1 | 4/2017 | Saurabh et al. |
| 9,710,322 | B2 | 7/2017 | Jewell et al. |
| 9,734,005 | B2 | 8/2017 | Ruan et al. |
| 9,772,898 | B2 | 9/2017 | Deshpande et al. |
| 9,811,795 | B1 | 11/2017 | Kearns et al. |
| 9,891,983 | B1 | 2/2018 | Dechiaro |
| 9,984,060 | B2 | 5/2018 | Bhattacharya et al. |
| 9,984,148 | B2 | 5/2018 | Lee et al. |
| 10,042,613 | B2 | 8/2018 | Castielli et al. |
| 10,042,697 | B2 | 8/2018 | Ahad |
| 10,083,073 | B2 | 9/2018 | Ambichl et al. |
| 10,120,747 | B2 | 11/2018 | Cunico et al. |
| 10,133,568 | B2 | 11/2018 | He et al. |
| 10,140,287 | B2 | 11/2018 | Dasgupta et al. |
| 10,140,576 | B2 | 11/2018 | Eldardiry et al. |
| 10,142,357 | B1 | 11/2018 | Tamersoy et al. |
| 10,162,696 | B2 | 12/2018 | Kogan-Katz et al. |
| 10,169,731 | B2 | 1/2019 | Brew et al. |
| 10,193,533 | B2 | 1/2019 | Chen et al. |
| 10,270,668 | B1 | 4/2019 | Thompson et al. |
| 10,303,533 | B1 | 5/2019 | Panov et al. |
| 10,318,541 | B2 | 6/2019 | Bingham et al. |
| 10,339,457 | B2 | 7/2019 | Ryckbosch et al. |
| 10,346,229 | B2 | 7/2019 | Tee et al. |
| 10,346,758 | B2 | 7/2019 | Natsumeda |
| 10,402,255 | B1 | 9/2019 | Niyogi |
| 10,467,318 | B2 | 11/2019 | Truitt et al. |
| 10,523,520 | B2 | 12/2019 | Aggarwal et al. |
| 10,552,289 | B2 | 2/2020 | Ilangovan et al. |
| 10,585,774 | B2 | 3/2020 | Chen et al. |
| 10,616,038 | B2 | 4/2020 | Kushmerick et al. |
| 10,628,747 | B2 | 4/2020 | Chen et al. |
| 10,637,745 | B2 | 4/2020 | Naous |
| 10,664,535 | B1 | 5/2020 | Hahn |
| 10,673,721 | B2 | 6/2020 | Hashimoto et al. |
| 10,701,096 | B1 | 6/2020 | Johnston et al. |
| 11,347,622 | B1 | 5/2022 | Agarwal et al. |
| 2004/0249821 | A1 | 12/2004 | Nies et al. |
| 2010/0011053 | A1* | 1/2010 | Bhogal ............. G06Q 10/00 709/206 |
| 2011/0087924 | A1 | 4/2011 | Kandula et al. |
| 2011/0083123 | A1 | 5/2011 | Lou et al. |
| 2013/0124923 | A1 | 5/2013 | Wang et al. |
| 2014/0365575 | A1 | 12/2014 | Spaven et al. |
| 2016/0124823 | A1 | 5/2016 | Ruan et al. |
| 2016/0253229 | A1 | 9/2016 | Sade et al. |
| 2016/0307285 | A1 | 10/2016 | Gallagher |
| 2017/0013003 | A1 | 1/2017 | Samuni et al. |
| 2017/0228460 | A1 | 8/2017 | Amel et al. |
| 2018/0041500 | A1 | 2/2018 | Menahem et al. |
| 2018/0144041 | A1 | 5/2018 | Chen et al. |
| 2018/0211197 | A1 | 7/2018 | Vosseler et al. |
| 2018/0219723 | A1 | 8/2018 | Scarpelli et al. |
| 2018/0308001 | A1 | 10/2018 | Doddala et al. |
| 2018/0359530 | A1 | 12/2018 | Marlow et al. |
| 2019/0073257 | A1 | 3/2019 | Dasgupta et al. |
| 2019/0114244 | A1 | 4/2019 | Salunke et al. |
| 2019/0188286 | A1 | 6/2019 | Chan et al. |
| 2019/0250970 | A1 | 8/2019 | Gupta et al. |
| 2019/0356533 | A1 | 11/2019 | Vasseur et al. |
| 2019/0391863 | A1 | 12/2019 | Ofer et al. |
| 2020/0076841 | A1 | 3/2020 | Hajimirsadeghi et al. |
| 2020/0084085 | A1 | 3/2020 | Tucker et al. |
| 2020/0104775 | A1 | 4/2020 | Chintalapati et al. |
| 2020/0117668 | A1 | 4/2020 | Chamarajnagar |
| 2020/0142954 | A1 | 5/2020 | Mandalia et al. |
| 2020/0167350 | A1 | 5/2020 | Miller et al. |
| 2020/0201701 | A1 | 6/2020 | Wang et al. |
| 2020/0226362 | A1 | 7/2020 | Hu et al. |
| 2020/0380408 | A1 | 12/2020 | Sridhar et al. |
| 2021/0064500 | A1* | 3/2021 | Przestrzelski ......... G06F 11/079 |
| 2021/0306361 | A1 | 9/2021 | Tanaka et al. |
| 2021/0342313 | A1 | 11/2021 | Riddell |
| 2021/0382770 | A1 | 12/2021 | Lu et al. |
| 2022/0269554 | A1 | 8/2022 | Saxena et al. |

FOREIGN PATENT DOCUMENTS

| | | |
|---|---|---|
| CN | 105577440 B | 6/2019 |
| CN | 106293648 B | 11/2019 |
| CN | 107248927 B | 6/2020 |
| CN | 113434357 A | 9/2021 |
| EP | 2863309 B1 | 11/2018 |
| KR | 101328328 B1 | 11/2013 |
| WO | 2015168141 A1 | 11/2015 |
| WO | 2017020973 A1 | 2/2017 |
| WO | 2017180666 A1 | 10/2017 |
| WO | 2020023787 A1 | 7/2019 |

OTHER PUBLICATIONS

Chen et al.; "Correlated Anomaly Detection From Large Streaming Data", BigData IEEE International Conference On, pp. 1-11, Dec. 10-13, 2018.

Du, M. et al., "DeepLog: Anomaly Detection and Diagnosis from System Logs through Deep Learning," Session F2: Insights from Log(in)s CCS'17, Oct. 30-Nov. 3, 2017, Dallas, TX, USA, 14 pages.

Eldardiry et al.; "Multi-Source Fusion For Anomaly Detection: Using across-domain and across-time peer-group consistency checks", JoWUA Journal Of, vol. 5, No. 2, pp. 39-58, Jun. 6, 2014.

Farschi et al.; "Anomaly Detection of Cloud Application Operations Using Log and Cloud Metric Correlation Analysis"; ISSRE IEEE 26th International Conference On, pp. 1-11, Nov. 2-5, 2016.

Gao et al.; "Modeling Probabilistic Measurement Correlations For . . . Distributed Systems", ICDCS IEEE 29th International Conference On, pp. 623-630, Jun. 22-26, 2009.

Leman Akoglu et al, "Graph based Anomaly Detection and Description: A Survey." Data Mining and Knowledge Discovery, vol. 29, No. 3 (2015): pp. 1-68.

List of IBM Patents or Patent Applications Treated as Related; Appendix P; Date Filed: Jan. 8, 2021; 2 pages.

Madireddy et al.; "Analysis And Correlation Of Application I/O Performance And System-Wide I/O Activity", Argonne National Laboratory, pp. 1-12, Apr. 2017.

Peiris et al.; "PAD: Performance Anomaly Detection In Multi-Server Distributed Systems", Cloud IEEE 7th International Conference On, pp. 769-776, Jun. 27-Jul. 2, 2014.

Peng et al.; "CM-GANs: Cross-Modal Generative Adversarial Networks For Common Representation Learning", Cornell University Library, arXiv:1710.05106v2, pp. 1-13, Apr. 26, 2018.

Song, Lei; "Informative Correlation Extraction From And For Forex Market Analysis", Auckland University Of Technology, Master's Thesis, pp. 1-73, May 2010.

U.S. Appl. No. 17/110,432, filed Dec. 3, 2020, Entitled: Multi-Source Data Correlation Extraction for Anomaly Detection, First Named Inventor: Yuk L. Chan.

U.S. Appl. No. 17/110,438, filed Dec. 3, 2020, Entitled: Correlation-Based Multi-Source Problem Diagnosis, First Named Inventor: Yuk L. Chan.

(56) References Cited

OTHER PUBLICATIONS

Yuk L. Chan et al., "Graph-Based Log Sequence Anomaly Detection and Problem Diagnosis," U.S. Appl. No. 17/110,535, filed Dec. 3, 2020.
Yuk L. Chan et al., "Integrating Documentation Knowledge With Log Mining for System Diagnosis," U.S. Appl. No. 17/110,430, filed Dec. 3, 2020.
Yuk L. Chan et al., "Log-Based Status Modeling and Problem Diagnosis for Distributed Applications," U.S. Appl. No. 17/110,513, filed Dec. 3, 2020.
Yuk L. Chan et al., "Message-Based Event Grouping for a Computing Operation ," U.S. Appl. No. 17/110,460, filed Dec. 3, 2020.
Yuk L. Chan et al., "Message-Based Problem Diagnosis and Root Cause Analysis," U.S. Appl. No. 17/110,458, filed Dec. 3, 2020.
Zhong et al.; "An Improved Correlation-Based Anomaly Detection Approach For Condition Monitoring Data Of Industrial Equipment", ICPHM IEEE Inter. Conf. On, pp. 1-6, Jun. 20-22, 2016.

\* cited by examiner

EYUTS0001I Topology event for *sysname* Initiated - APPLID (*applid*) CICSplex (*plexname*)

Explanation

Topology Services has begun processing a communications endpoint event for the specified CICS® system, where:

event Identifies the event as one of the following:

Connect A physical connection between the MAS (CICS system) and its maintenance point CMAS.

Join A logical connection between the MAS (CICS system) and another CMAS.

Disconnect A disconnection of the MAS (CICS system) from its maintenance point CMAS.

sysname Identifies the MAS name for the CICS system.

applid Identifies the APPLID of the CICS system.

plexname Identifies the CICSplex the CICS system is being processed for.

System action Processing continues.

User response None.

Module EYU0TSSC, EYU0TSSE, EYU0TSSJ.

Destination
Console, job log, EYULOG

FIG. 4

EYUTS0003I   Topology event for *sysname* Complete - APPLID (*applid*) CICSplex (*plexname*)

Explanation

Topology Services has completed a communications endpoint event for the specified CICS® system, where:
event Identifies the event as one of the following:
  Connect A physical connection between the MAS (CICS system) and its maintenance point CMAS.
  Join A logical connection between the MAS (CICS system) and another CMAS.
  Disconnect A disconnection of the MAS (CICS system) from its maintenance point CMAS.
sysname Identifies the MAS name for the CICS system.
applid Identifies the APPLID of the CICS system.
plexname Identifies the CICSplex the CICS system is being processed for.

System action Processing continues.

User response None.

Module EYU0TSSC, EYU0TSSE, EYU0TSSJ

Destination
Console, job log, EYULOG

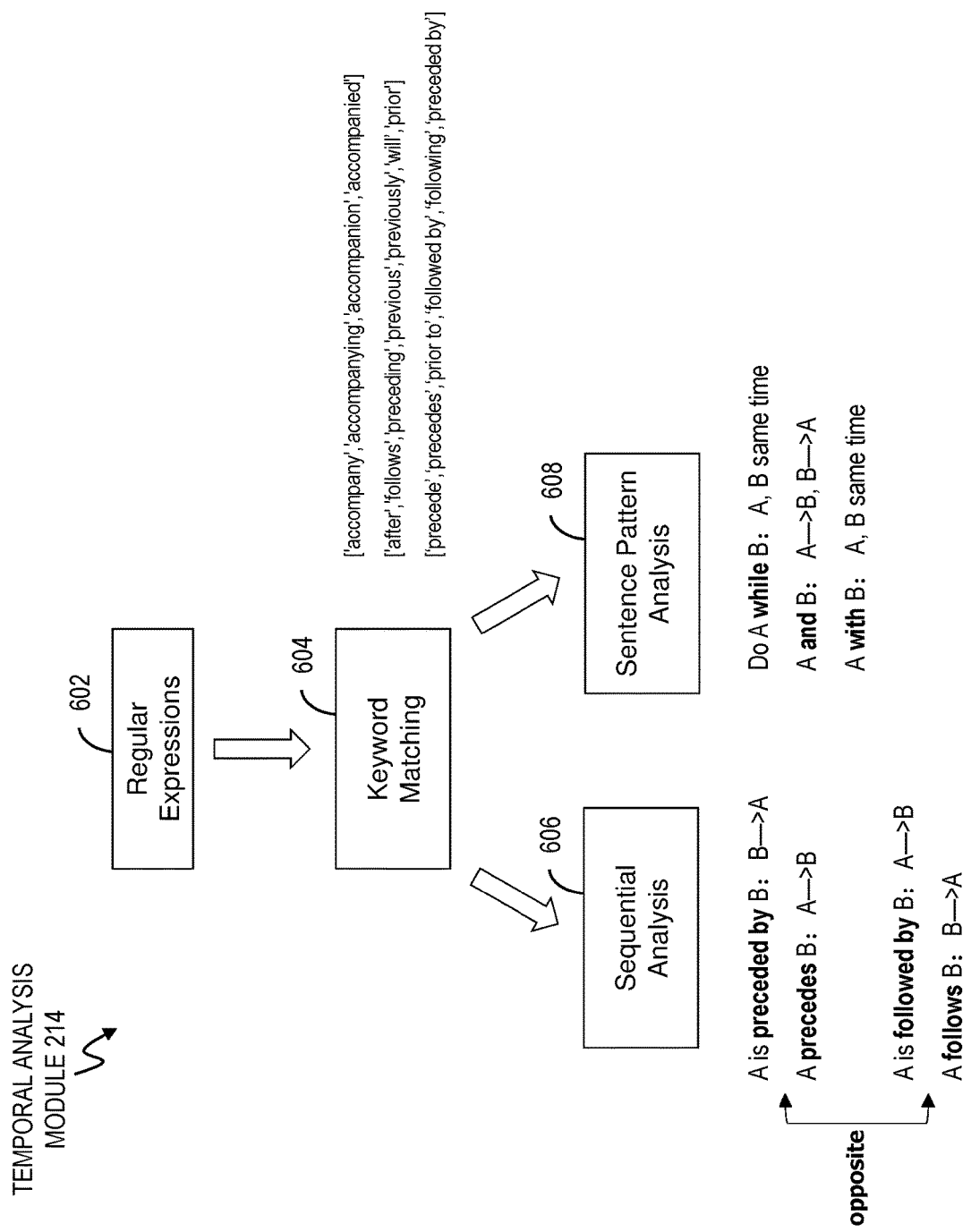

MESSAGE CORRELATION EXTRACTION FOR MAINFRAME OPERATION

BACKGROUND

The present invention generally relates to computer systems, and more specifically, to computer systems, computer-implemented methods, computer program products to perform message correlation extraction for mainframe operation.

Mainframe computing systems are high-performance computer systems that can include a hierarchy of units such as a number of different computer nodes, servers, switches, and storage systems. An organization will typically use a mainframe to host commercial databases, transaction servers, and applications that require a greater level of processing power and security than found on a standard computing device. System administrators can determine a mainframe computing system's performance by monitoring log messages written by applications running on the mainframe's components.

Mainframe logs offer essential insights into how to manage complex computing environments. These messages can be used to monitor system activities, keep the system correctly running, and to diagnose system problems. Different types of logs can be generated during system operation to record various events. Messages can be issued to the system operator at the system console of each subsystem. To ease review and debugging, these messages can be supplemented with explanations and user responses to provide context for the various situations that are associated with each message.

SUMMARY

Embodiments of the present invention are directed to automated message correlation extraction for mainframe operation. A non-limiting example computer-implemented method includes receiving a first message log entry having a message identifier and message field data. The first message log entry is pre-processed to determine the message identifier and to tokenize the message field data. A second message log entry is identified based on at least one of the message identifier and the tokenized message field data. The method further includes determining that the second message log entry is correlated with the first message log entry and providing an output comprising the message correlation between the first message log entry and the second message log entry.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 illustrates a log message in accordance with one or more embodiments of the present invention;

FIG. 5 illustrates a log message in accordance with one or more embodiments of the present invention;

FIG. 6 is a block diagram of a temporal analysis module in accordance with one or more embodiments of the present invention;

DETAILED DESCRIPTION

Figure 1:
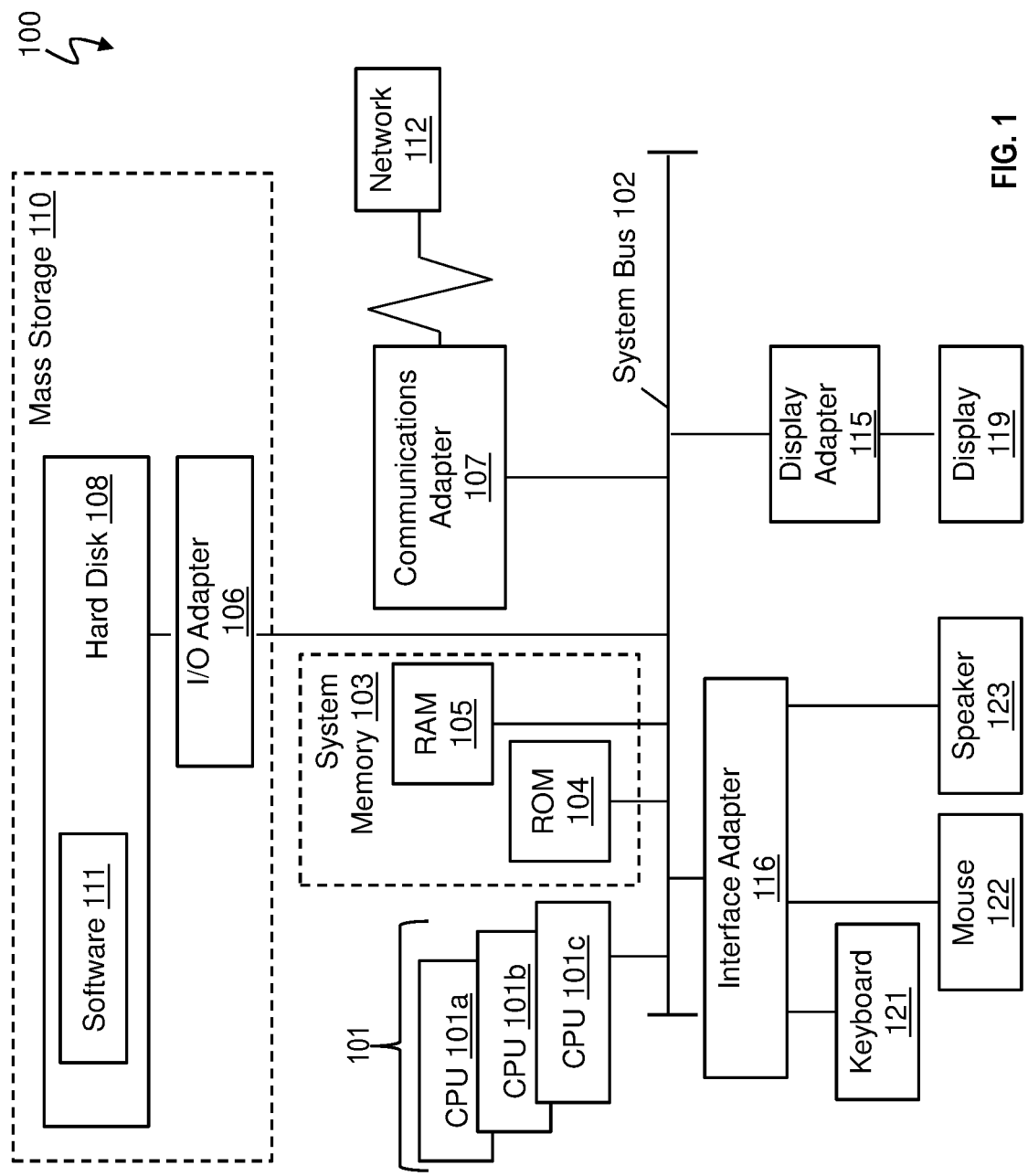
FIG. 1 depicts a block diagram of an example computer system for use in conjunction with one or more embodiments of the present invention.

System administrators can determine a mainframe computing system's performance by monitoring log messages written by applications running on the mainframe's components. Log message analysis itself, however, can be complicated. Mainframe logs consist of highly technical information that can be difficult and time-consuming to interpret. For complex computing systems (e.g., mainframes) it can be hard to determine the sophisticated correlations and causality among various messages. Manual review of these logs by a system administrator can be very time consuming and error prone.

Complications can arise from various factors. For example, applications often generate multiple log messages for a single event. Additionally, for a multi-purpose mainframe two or more applications can write log messages at the same time for a common event. As the system administrator views log messages independently, it can be difficult to ascertain the subtle relationships between different log messages. Very often, however, understanding the greater context or "type of relationship" between log events is necessary to determine the severity of an anomaly or error, to properly diagnose the cause of the anomaly or error, and to implement improvements to avoid or mitigate the error in the future.

Determining the relationship between log events requires the system administrator to have an in-depth domain knowledge of the mainframe's information technology environment and its operation data. The system administrator also needs a detailed grasp of the characteristics of the current operating system of the mainframe as well as an understanding of any previous analysis of similar log messages. Consequently, log review is usually reserved for manual review by domain experts.

One or more embodiments of the present invention address one or more of the above-described shortcomings by providing computer-implemented methods, computing systems, and computer program products configured to perform message correlation extraction for mainframe operation. In some embodiments, a message analytics approach based on Darwin Information Typing Architecture (DITA) files is leveraged to automatically and intelligently extract correlations among messages. DITA files are essentially text files encoded in plain text format that are integrated with XML-based specifications and standards. The DITA specification defines a set of document types for authoring and organizing topic-oriented information, as well as a set of mechanisms for combining, extending, and constraining document types.

In some embodiments, message correlation extraction can be improved by using natural language processing (NLP) and mainframe specific domain knowledge to extract relationships between known messages. Relationship extraction can be computed using three different, complementary approaches. A co-occurrence analysis module extracts message collocation relationships (e.g., if two messages are mentioned in one message body or one message is referred by another message in the same context). A temporal analysis module discovers a sequential order of occurrences (e.g., A preceded in time by B, etc.) for messages using, for example, keyword searching and pattern-based matching to provide dynamic message relations based on the temporal behaviors of messages. A semantic analysis module extracts semantic relations (e.g., condition, execution result, exception, etc.) based on a part of speech (PoS) analysis, sentence pattern, and distance filtering to eliminate ambiguous noise. Semantic analysis can provide extra information about the messages such as, for example, an action taken, resources consumed, etc. These three approaches can be used separately or together in any combination to supplement the overall quality of the system's automated message correlation extraction. Advantageously, message correlation extraction can be automated by the system using these complementary approaches without the need for manual intervention by a domain expert.

Identifying message correlations in this manner offers several advantages over conventional approaches. For example, the present invention can be used to leverage node discovery in ops graph construction automatically and without or with less pre-knowledge. By using co-occurrence analysis according to one or more embodiments, we can easily find those messages/element pairs (or triplets, etc.) which always occur or disappear at the same time when an event/alert happens. By using temporal analysis according to one or more embodiments, the system can generate a sequential order of messages using keyword searching, sequential analysis, and pattern-based matching to provide additional contextual clues for problem diagnosis. By using semantic analysis according to one or more embodiments, the system can extract the actions executed or secondary information (e.g., additional information mentioned in the main body of the messages) in that way helps to find subtle correlations of messages under specific conditions.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
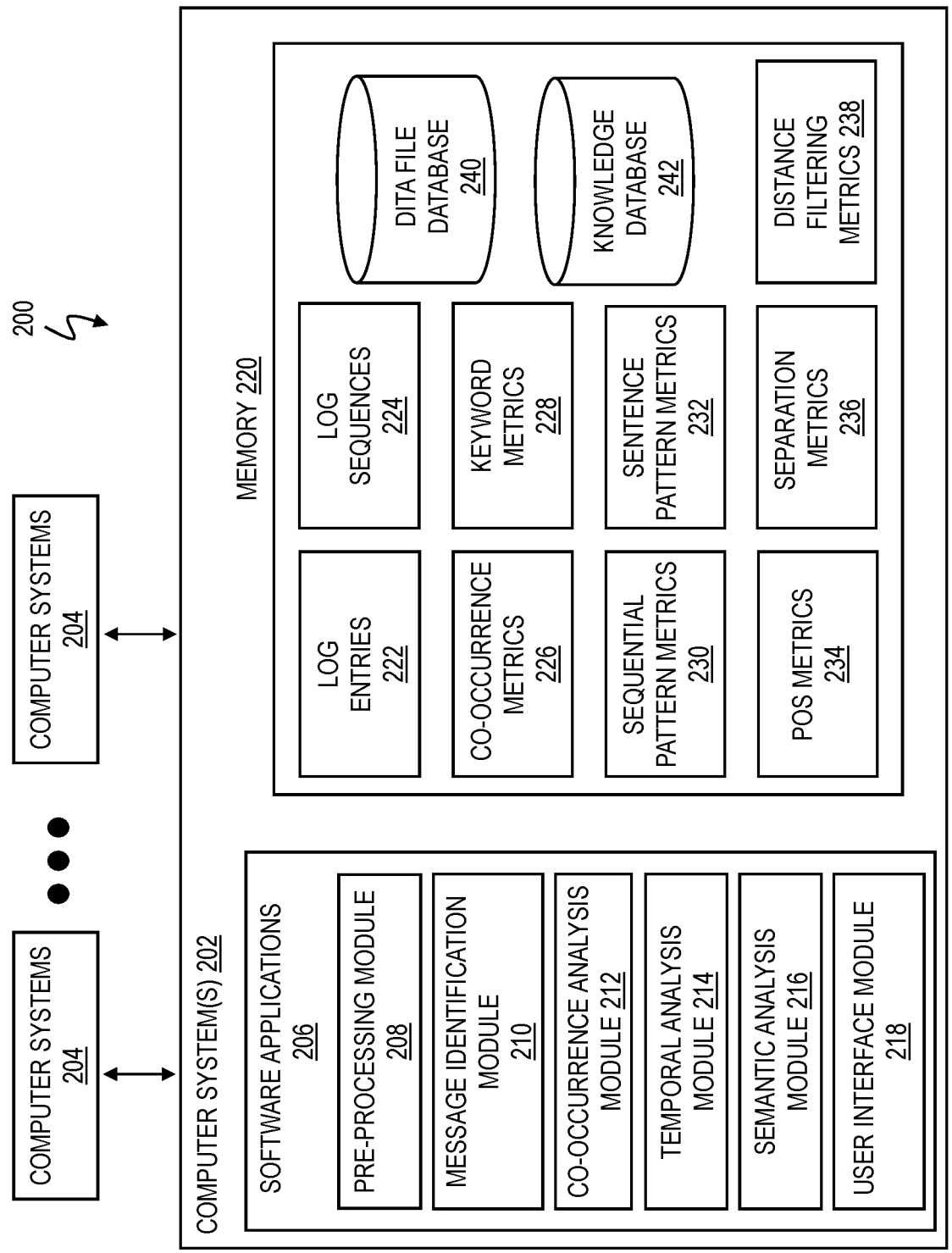
FIG. 2 is a block diagram of a system for message correlation extraction in accordance with one or more embodiments of the present invention.

FIG. 2 is a block diagram of a system 200 for log message correlation extraction in accordance with one or more embodiments of the present invention. FIG. 2 depicts one or more computer systems 202 coupled to one or more computer systems 204 via a wired and/or wireless network. For example, computer system 202 can be representative of numerous computers in a datacenter servicing various users, and computer systems 204 can be representative of numerous computers in a datacenter. One or more of the computer systems 202 can be configured to collect metrics and logs associated with the operation of one or more of the computer systems 204, where the computer systems 204 can also be referred to as monitored computer systems 204. The monitored computer systems 204 may be observed to collect representative performance data and events during operation of the system 200. Elements of the computer system 100 of FIG. 1 may be used in and/or integrated into computer systems 202 and computer systems 204. One or more software applications 206 can include a pre-processing module 208, a message identification module 210, a co-occurrence analysis module 212, a temporal analysis module 214, a semantic analysis module 216, and a user interface module 218. The software applications 206 may utilize and/or be implemented as software 111 executed on one or more processors 101, as discussed in FIG. 1.

Figure 3:
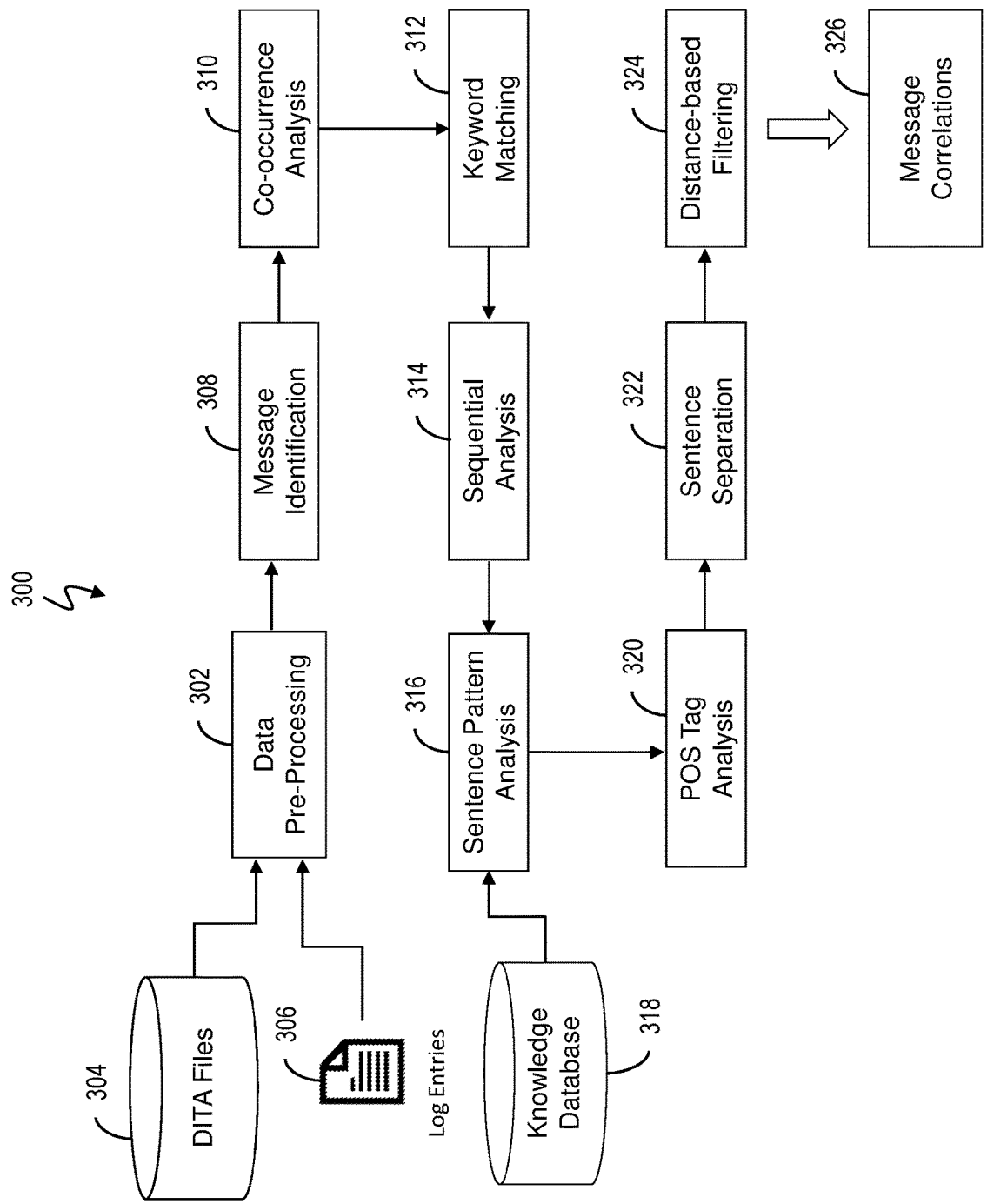
FIG. 3 is a block diagram of a dataflow for message correlation extraction in accordance with one or more embodiments of the present invention.

Memory 220 of the computer systems 202 can store, for example, a plurality of log entries 222 (e.g., message log entries), log sequences 224, co-occurrence metrics 226, keyword metrics 228, sequential pattern metrics 230, sentence pattern metrics 232, part of speech (POS) metrics 234, separation metrics 236, and/or distance filtering metrics 238. A dataflow 300 of FIG. 3 illustrates interactions between various components of the software applications 206 and memory 220 of FIG. 2 for log message correlation extraction. In some embodiments of the invention, the pre-processing module 208 is configured to retrieve DITA files from the DITA file database 240. In some embodiments of the invention, the DITA files are stored in a subsystem (e.g., mainframe subsystem) of the computer system(s) 202. In some embodiments of the invention, the DITA files include log messages (sometimes referred to as DITA messages or DITA log messages). In some embodiments of the invention, the pre-processing module 208 is configured to retrieve one or more log messages (e.g., DITA files) written by an application running on the mainframe. In some embodiments of the present invention, the pre-processing module 208 can store the log messages from the mainframe's system as log entries 222.

The pre-processing module 208 can include a message parser that performs a process of tokenization (sometimes referred to as text segmentation or lexical analysis) of the log message to separate the log message text into a list of tokens. The individual tokens can include, for example, individual words, phrases, sections, and sentences. The message parser can further remove noisy data by performing a clean stopword technique to remove stopwords from the text string of a log message. Stopwords are words or phrases that provide little value to deriving the context of a log message. For example, commons stopwords that can be filtered out of the strings include "is", "an", and "the". The message parser can apply various techniques to determine whether a word or phrase is a stopword. For example, the message parser can access a library of stopwords from the knowledge database 242, compare the entries in the library to the words contained in the log message, and remove the stopwords as defined by the dictionary.

The pre-processing module 208 can also perform a stemming technique or a lemmatization technique on the tokens that remain after the stopwords have been removed. Stemming refers to the heuristic technique of removing the end (e.g., the suffix) of a word to reach a common base form. For example, the "participated", "participant", and "participating" can each be reduced to "partipat" by removing the end of the words. Lemmatization is a technique that applies the use of vocabulary and a morphological analysis of the words to determine the common base form. The message identification module 210 can further convert the remaining tokens into a word vector. A word vector is a numeric representation of the respective entity types of the remaining tokens and denotes their semantic meaning. Converting the log messages into word vectors assists with the statistical analysis of the log messages.

The message identification module 210 is configured to identify a retrieved log message. FIG. 4 illustrates an example template for a log message 400 and a narrative explanation is shown. The log message 400 includes a message template 402, which includes a message ID 404 and a message text 406. FIG. 5 illustrates a log message 500 that is correlated with the log message shown in FIG. 4. Specifically, FIG. 4 illustrates the log message 400 for initiation of the topology event, and FIG. 5 illustrates the log message 500 for completion of the topology event (i.e., message 400→message 500 is a discoverable correlation according to one or more embodiments).

In some embodiments of the invention, each log message (e.g., the log messages 400 and 500) includes a message identifier that describes the type of message, the source of the message, and one or more fields describing the content or value of the message (e.g., "When this message is processing data sets named in preceding msgB, see msgC for an explanation and corrective action.") For example, the message identifier can be an alphanumeric string such as EYUTS0001I. After the pre-processing module 208 (e.g., message parser) has tokenized the log message, the message identification module 210 can detect the message identifier and identify the log message by comparing the message identifier to an operating system-specific table or dictionary of message identifiers. The operating system-specific table or dictionary can include a standard format of the log message and can be stored, for example, in the knowledge database 242. The message identification module 210 can further compare the format of the message to the standard format to verify the message's identity.

The co-occurrence module 212 is configured to analyze two or more messages in the log entries 222 for co-occurrences. In some embodiments of the invention, the co-occurrence module 212 is configured to extract collocation relations if two of them are mentioned in one message body or one is referred by the other in the same context. For example, a first message (e.g., message A) can include a message entry (e.g., message field data) "Refer to the information in the accompanying message B to determine the cause of the I/O error" or a message entry "If you are not doing an automatic rebind, message B might accompany this message and identify that resource". These message entries can be input to the co-occurrence module 212 and resolved as the co-occurrence output pair "msgA-msgB" indicating that message A and message B co-occur. In other words, message A implies message B and visa versa (e.g., if A, look for B; if B, look for A). In some embodiments of the invention, the output of the co-occurrence module 212 can be stored as co-occurrence metrics 226.

The temporal analysis module 214 and/or the semantic analysis module 216 can be configured to retrieve domain-specific data from the knowledge database 242. The temporal analysis module 214 can be further configured to analyze two or more messages in the log entries 222 to determine a temporal relation between the messages. For example, a first message (e.g., message A) can include a message entry (e.g., message field data) "A is preceded by B" or a message entry "A follows B". These message entries can be input to the temporal analysis module 214 and resolved as temporal output data "B→A" or "A→B", respectively, indicating that message A occurs after (or before) message B. FIG. 6 illustrates additional possible functionality of the temporal analysis module 214.

In some embodiments of the invention, the temporal analysis module 214 is configured to receive a regular expression 602 (e.g., message field data, a string parsed from a message field, etc.) and to perform one or more of keyword matching 604, sequential analysis 606, and sentence pattern analysis 608 on the regular expression 602 to determine a temporal relationship between two or more messages.

In some embodiments of the invention, keyword matching 604 includes a word-by-word comparison of each word or token in a message against one or more predetermined keywords stored, e.g., in the knowledge database 242. Keywords can include, for example, "accompany," "after," "preceded by," and "following," although it is understood that any number of additional keywords are possible. In some embodiments of the invention, the keywords are linked or otherwise associated with predetermined message relationship contexts. For example, the keyword "after" can be paired with the concept A→B. In this manner, the keywords can leverage domain knowledge to quickly indicate message relationships. In some embodiments of the invention, keyword matching data can be stored as keyword metrics 228.

In some embodiments of the invention, Sequential Analysis 606 includes analyzing message data (e.g., message field data, message token data, etc.) to discover sequential order variations. For example, a first message A may include the string "A is preceded by B" while a second message C may include the string "A is followed by B." Note that message C need not be the same as message B. This type of analysis can be used to discover variations in the sequences of messages. Continuing from the prior example, the relationships A→B and B→A are possible. In some embodiments of the invention, sequential analysis data can be stored as sequential pattern metrics 230.

In some embodiments of the invention, Sentence Pattern Analysis 608 includes analyzing message data (e.g., message field data, message token data, etc.) to discover sentence patterns. For example, a first message A may include the string "Message B will be present in the system log when a coordinated AES master key change has occurred as noted in message C." This type of analysis can indicate complex relationships that are otherwise missed by keyword or sequence searches. Continuing from the prior example, the relationship "if C→B must exist" can be discovered. As another example, a first message A may include "If you are not doing an automatic rebind, message B might accompany this message and identify that resource." Sentence pattern analysis for this string could indicate that A→B is an optional relationship. In some embodiments of the invention, sentence pattern data can be stored as sentence pattern metrics 232.

Figure 7:
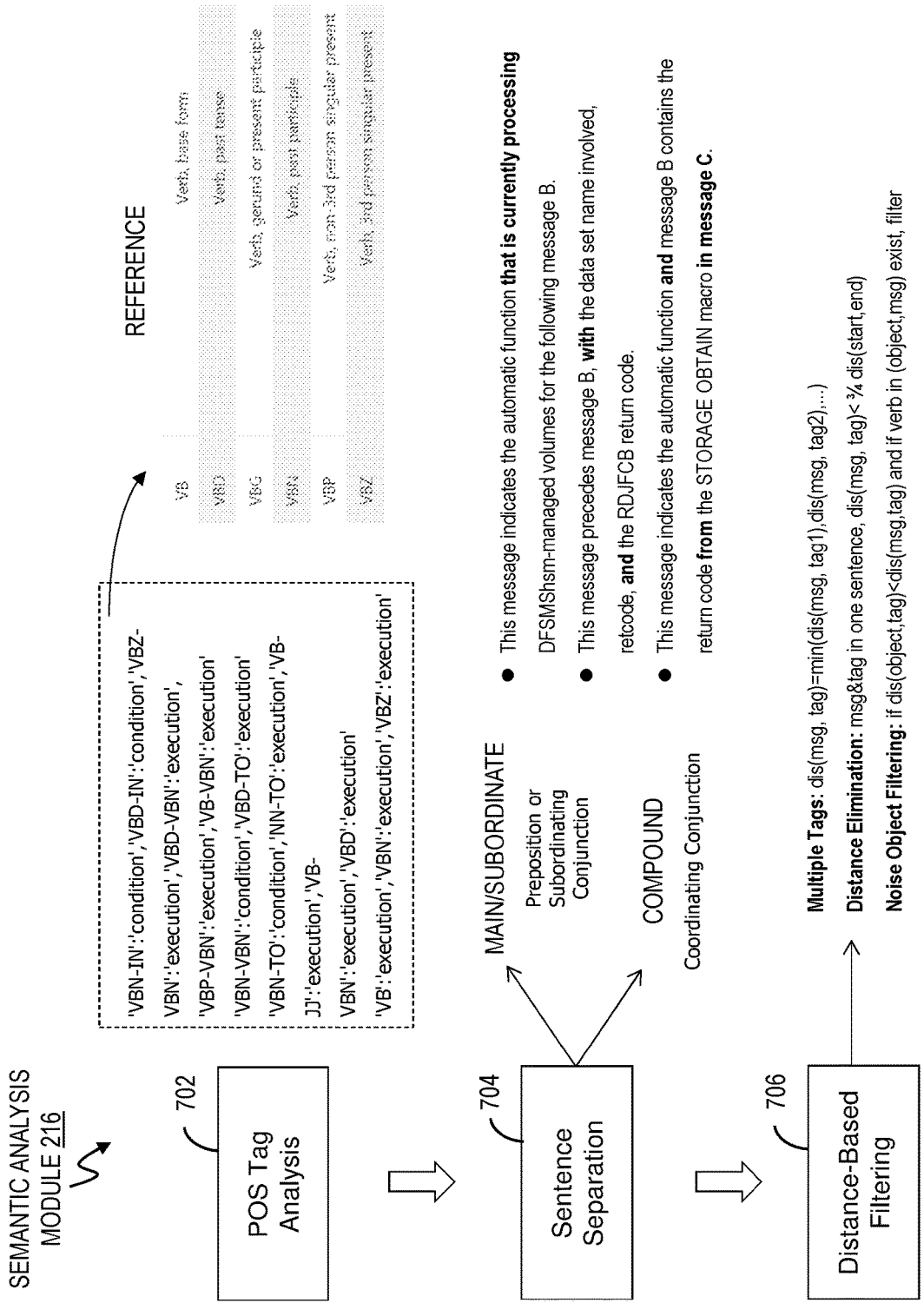
FIG. 7 is a block diagram of a semantic analysis module in accordance with one or more embodiments of the present invention.

The semantic analysis module 216 can be further configured to analyze two or more messages in the log entries 222 to determine a semantic relation (e.g., a condition, execution, action taken, resource consumed, exception, etc.) between the messages. In some embodiments of the invention, the semantic analysis module 216 is configured to receive a regular expression (e.g., message field data, a string parsed from a message field, etc.) and to perform one or more of POS tag analysis 702, sentence separation 704, and distance-based filtering 706 on the regular expression to determine a semantic relationship between two or more messages. FIG. 7 illustrates additional possible functionality of the semantic analysis module 216.

The semantic analysis module 216 can analyze log messages and construct a knowledge graph that reveals the correlations between log messages. Each log message contains a message identification, a message text, and a timestamp indicating when the message was written. The semantic analysis module 216 can semantically and statistically analyze each log message and determine a context of the message. The semantic analysis module 216 can apply natural language processing techniques to analyze the morphology, syntax, and logical semantics of the text of the log message to determine a phrase composition of the log message. For example, the semantic analysis module 216 can traverse the text of the message graph to determine a context of the log message (e.g., an exception, an execution, etc.). In some embodiments of the invention, the semantic analysis module 216 can make correlation determinations based on a functional relationship between log messages. For example, a message identification code of a first log message can be analyzed to detect that the log message relates to the initiation of a job task K. The semantic analysis module 216 can retrieve a second message identification code of a second log message and detect that the second log message relates to either the completion of the job task or a conditional response to initiation of the job task. In this instance, semantic analysis reveals that the two log messages are functionally correlated.

In some embodiments of the invention, POS tag analysis 702 includes analyzing message data (e.g., message field data, message token data, etc.) to identify parts of speech in the message data that can be leveraged to discover a message correlation. For example, a first message (e.g., message A) can include a message entry "This message indicates an exception thrown by message B when the data is null." The past tense of "thrown" can indicate that message A occurs as a potential trigger from message B.

In some embodiments of the invention, POS tag analysis 702 includes annotating messages (or tokens) based on a definition and a context of the word within the log message. For example, POS tag analysis 702 can annotate a token with the label "program", "component", "noun", "verb", or "adjective". POS tag analysis 702 can determine which labels to choose based on a dictionary, an ontology, or rules. It some instances, the semantic analysis module 216 is executed by machine learning circuitry or a neural network. In these instances, POS tag analysis 702 can be trained to annotate the tokens. It should be appreciated that in many instances, operating systems apply specialized definitions of words or phrases. Therefore, POS tag analysis 702 can annotate a token with labels with respect to a particular operating system. In some embodiments of the invention, POS tag data can be stored as POS metrics 234.

In some embodiments of the invention, sentence separation 704 includes analyzing message data (e.g., message field data, message token data, etc.) to identify sentence separators (prepositions or conjunctions) that can be leveraged to discover a message correlation. In some embodiments of the invention, a first message (e.g., message A) can include a message entry (e.g., message field data) that indicates a main/subordinate relationship or a compound relationship with respect to another message (e.g., message B). In some embodiments of the invention, sentence separation data can be stored as separation metrics 236.

To discover a main/subordinate or compound relationship a first message can include a preposition, subordinating conjunction, or coordinating conjunction that indicates that a first message A has a dominant, subordinate, or compound relationship to a second message B. For example, the entry "This message indicates the automatic function from the STORAGE OBTAIN macro in message C" indicates that message A automatically follows, and is subordinate to, message C (i.e., C→A). A subordinating conjunction is a word which joins a dependent clause and an independent clause (e.g., BEFORE, AFTER and UNTIL). The most common subordinating conjunctions in the English language include: than, rather than, whether, as much as, whereas, that, whatever, which, whichever, after, as soon as, as long as, before, by the time, now that, once, since, till, until, when, whenever, while, though, although, even though, who, whoever, whom, whomever, whose, where, wherever, if, only if, unless, provided that, assuming that, even if, in case (that), lest, how, as though, as if, because, since, so that, in order (that), that, and as. A coordinating conjunction may join single words or groups of words of the same element type (e.g. subject A and subject B, verb phrase A and verb phrase B, sentence A and sentence B, but not subject A and verb phrase B). Common coordinating conjunctions are for, and, nor, but, or, yet, and so. Correlative conjunctions are always used in pairs and join similar elements. Common correlative conjunctions are "both . . . and," "not only . . . but also," "either . . . or," "neither . . . nor," and "whether . . . or."

In some embodiments of the invention, distance-based filtering 706 includes analyzing message data (e.g., message field data, message token data, etc.) to determine distances between discovered relationships (e.g., A→B and B→C indicates A→C) that can be leveraged to filter message correlations that are outside a threshold. In some embodiments of the invention, messages that are preliminarily linked due to an association discovered via prior correlation analysis (e.g., via co-occurrence analysis module 212, temporal analysis module 214, and/or semantic analysis module 216) can be discarded if a distance between the messages is greater than a threshold. For example, messages can be treated as nodes connected via edges that denote a preliminary correlation. A threshold can be set such that messages linked after N or more nodes are discarded. For example, message A (node 1) is linked to message B (node 2). Message B can be linked to message C (node 3). Message C can be linked to message D (node 4). The distance threshold could be set, for example, to a maximum value of "2", resulting in the preliminary correlation between message A and message D to be discarded. In some embodiments of the invention, message distance data can be stored as distance filtering metrics 238.

In some embodiments of the invention, multiple "paths" exist between message pairs. Consider, for example, A→B, B→C, C→D, D→E (length 4) and A→B, B→E (length 2). In some embodiments of the invention, a distance function dis(msg1, msg2) can be defined as the minimum distance available between the two end nodes (here, messages A and E at a minimum distance of 2).

In some embodiments of the invention, distance-based filtering is applied at the intra-message level (e.g. within a single message field) to determine which one of several tags (e.g., a POS tag) should apply to a word, phrase, or token within a message when more than one tag exists in the message. For example, the message A "This exception precedes message B and is thrown as an exception to the process defined in message C" has several POS elements (e.g., "precedes" and "is thrown"). In some embodiments of the invention, a tag distance function dis(msg1, tag) can be defined as min(dis(msg, tag1), dis(msg, tag2), . . . ). In other words, as the tag that provides the minimum distance to the message element (here, "precedes" occurs next to message B and is remote from message C, so the distance-based filtering can discard message C with respect to the "precedes" tag).

In some embodiments of the invention, distance-based filtering can determine if a message is too far from the target message relative to the distance of the sentence. For example, the message A "This message indicates errors related to network connections and it has nothing to do with message B." In this sentence, "This message" is the target message, which is message A; "indicates" is the verb for the target message (i.e. the POS tag). In some embodiments, we will determine the distance of other messages in the sentence and the distance from the POS tag. If this distance is greater than a specific percentage of the sentence's length, then this message is considered as "unrelated to the target message".

For example, a "Distance Elimination" formula can be defined as dis(msg, tag)<N dis(start, end) where N can be some percentage (e.g., 75%, 50%, etc.) of the message length. In this formula, dis(msg, tag) defines the distance in words between the message-tag pair while dis(start, end) defines the sentence length. Applying "Distance Elimination" to the above example, dist(msg, tag) will be 14 words, and it is greater than N dis(start, end), which evaluates to 12 (e.g., the sentence length is 16, ¾ sentence length is 12). Therefore, message B can be eliminated from consideration for a relationship with message A. The percentage of sentence length can be determined dynamically based on other log messages. For example, one thousand messages that reference other messages could be looked at. For each message, the ratio of dist(msg, tag)/dist(start, end) can be determined. In some embodiments of the invention, a threshold (e.g., a specific percentile, for example 70%, 40%, 80%, etc.), can be used to select a ratio cutoff. For example, if 70% (or 50%, etc.) of all dist(msg, tag)/dist(start, end) ratios are less than 85%, then this ratio can be used as the percentage of sentence length. In other words, the percentage of sentence length can be dynamically selected to determine "good" values for "N" above (i.e., those values of N that capture some threshold amount of the total message-tag pairs.

In some embodiment of the invention, noise object filtering will be used to remove complex sentence and relationship pairs. For example, consider the message A "This message triggers an alert and the process will terminate with message B". "An alert" and "process" are nouns. Message B will be considered noise because it's related to "the process" with the verb "terminate" rather than to the "alert" (i.e., the noun for the target message A). In one embodiment, noise object filtering can be determined using two conditions: "if dis(object,tag)<dis(msg,tag)" and "if verb in (object,msg) exist". In this algorithm, the nouns "an alert" and "the process" are considered objects; dis(object, tag) defines the distance between the object and the POS tag; and, "dis (object,tag)<dis(msg,tag)" defines whether are other nouns between message B and POS tag. In other words, if other nouns have a smaller distance to the tag than message B. The term, "if verb in (object, msg) exist" means if there are verbs between the pair (an alert, message B) or the pair (the process, message B), and in our example, "terminate" is a verb between the (object, msg) pair (alert, message B). Because both conditions are true, "Message B" can be eliminated from consideration for a relationship with message A.

The user interface module 218 can be configured to provide an output to a user interface (e.g., interface adaptor 116 of FIG. 1) of a display (e.g., display adaptor 115 of FIG. 1). In some embodiments of the invention, the user interface module 218 is configured to generate and display an alert or other message description one or more message correlations extracted according to one or more embodiments.

FIG. 3 is a block diagram of a dataflow for message correlation extraction in accordance with one or more embodiments of the present invention. As shown in FIG. 3, the dataflow can begin with data pre-processing 302. Data pre-processing 302 can receive as input DITA files 304 and log entries 306. In some embodiments of the invention, the log entries 306 are formatted as DITA files as discussed with respect to the pre-processing module 208 of FIG. 2. Message identification 308 can receive the pre-processed message data and can identify a retrieved log message and message data (form data, tokens, etc.) as discussed with respect to the message identification module 210 of FIG. 2.

Pre-processed and identified messages can be analyzed using co-occurrence analysis 310 in a similar manner as discussed with respect to the co-occurrence analysis module 212 of FIG. 2. In addition, or alternatively, pre-processed and identified messages can be analyzed using temporal analysis (e.g., keyword matching 312, sequential analysis 314, and/or sentence pattern analysis 316) in a similar manner as discussed with respect to the temporal analysis module 214 of FIG. 2. In addition, or alternatively, pre-processed and identified messages can be analyzed using semantic analysis (e.g., POS tag analysis 320, sentence separation 322, and distance-based filtering 324) in a similar manner as discussed with respect to the semantic analysis module 216 of FIG. 2. As shown, sentence pattern analysis 316 can receive as additional input data from a knowledge database 318. Although not shown for simplicity, each of the modules (e.g., POS tag analysis 320, keyword matching 312, etc.) can directly or indirectly receive data from the knowledge database 318. Moreover, while shown as a single, particular dataflow for ease of discussion, it is understood that the relative ordering of co-occurrence, temporal, and semantic analysis can be modified and that each portion can be processed in series or in parallel.

In some embodiments of the invention, one or more message correlations 326 can be discovered during one or more of the prior analysis. In some embodiments of the invention, these message correlations 326 can be packaged and provided to a system or user (e.g., via user interface module 218).

Figure 8:
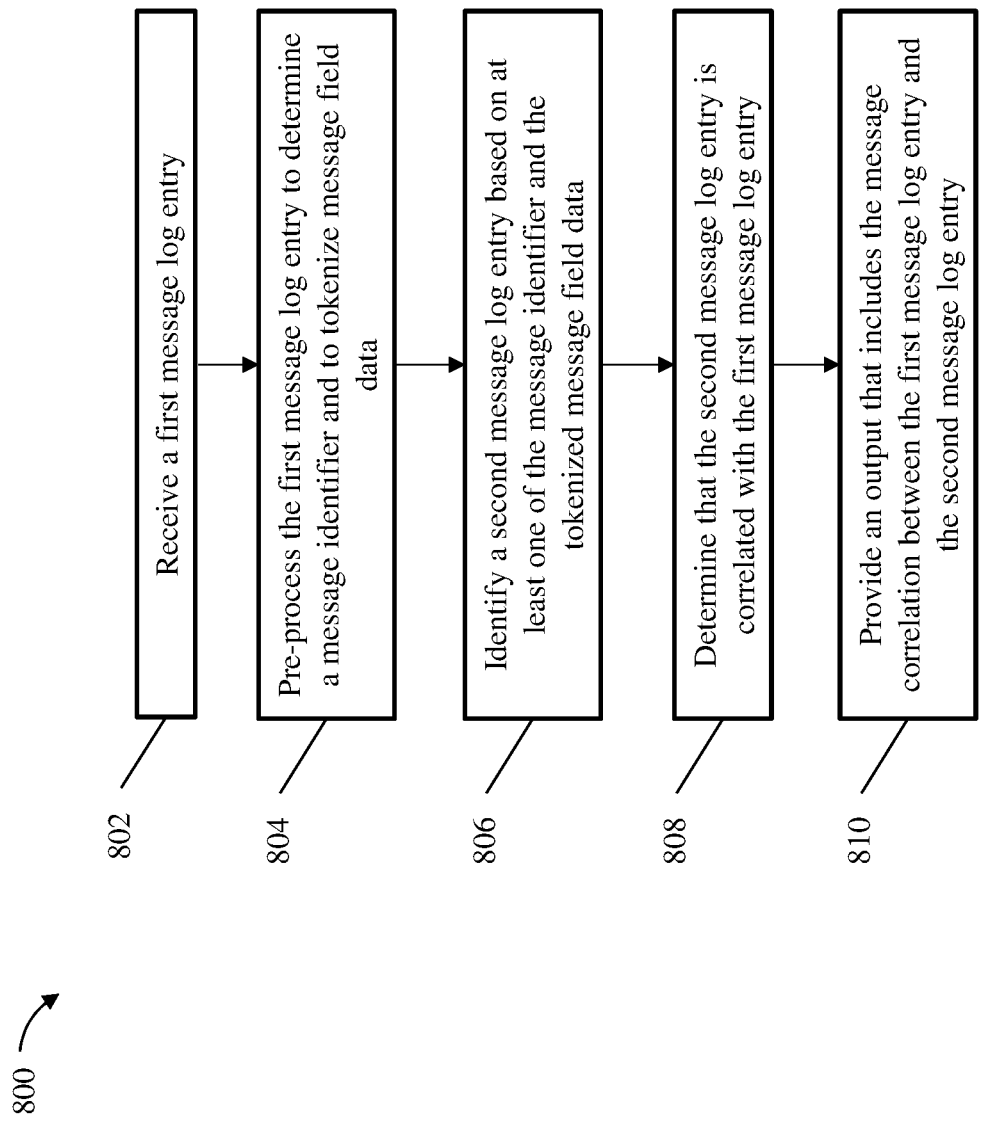
FIG. 8 is a flowchart for message correlation extraction in accordance with one or more embodiments of the present invention.

FIG. 8 is a flowchart 800 for message correlation extraction according to an embodiment. The flowchart 800 is described in reference to FIGS. 1-7 and may include additional steps not depicted in FIG. 8. Although depicted in a particular order, the blocks depicted in FIG. 8 can be rearranged, subdivided, and/or combined. At block 802, a first message log entry is received. The first message log entry can include a message identifier and message field data.

At block 804, the first message log entry is pre-processed to determine the message identifier and to tokenize the message field data. At block 806, a second message log entry is identified based on at least one of the message identifier and the tokenized message field data.

At block 808, determine that the second message log entry is correlated with the first message log entry. In some embodiments of the invention, determining that the second message log entry is correlated with the first message log entry includes determining that the second message log entry co-occurs with the first message log entry. In some embodiments of the invention, a type of correlation between the first message log entry and the second message log entry is determined.

In some embodiments of the invention, determining the type of correlation includes identifying a temporal relationship between the first message log entry and the second message log entry. In some embodiments of the invention, identifying the temporal relationship includes one or more of keyword matching, sequential analysis, and sentence pattern analysis.

In some embodiments of the invention, determining the type of correlation includes identifying a semantic relationship between the first message log entry and the second message log entry. In some embodiments of the invention, identifying the semantic relationship includes one or more of part of speech (POS) tagging, sentence separation analysis, and distance-based filtering.

At block 810, provide an output that includes the message correlation between the first message log entry and the second message log entry. The output can be pushed to a user interface, provided as an alert, or recorded internally for later analysis.

Technical advantages and benefits include using a knowledge database and various analysis schemes (e.g., co-occurrence, temporal, semantic) to automatically extract message correlation data without the need for manual determinations by a domain expert. Automating message correlation extraction for problem diagnosis (e.g., debugging) can result in improved accuracy over human actors and can significantly reduce the time required to find correlations. One potential domain that would be well-serve by an embodiment of the present message correlation extraction techniques is in node discovery in ops graph construction, which, according to one or more embodiments, can be done automatically and accurately without or with less pre-knowledge than is necessary using conventional techniques.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
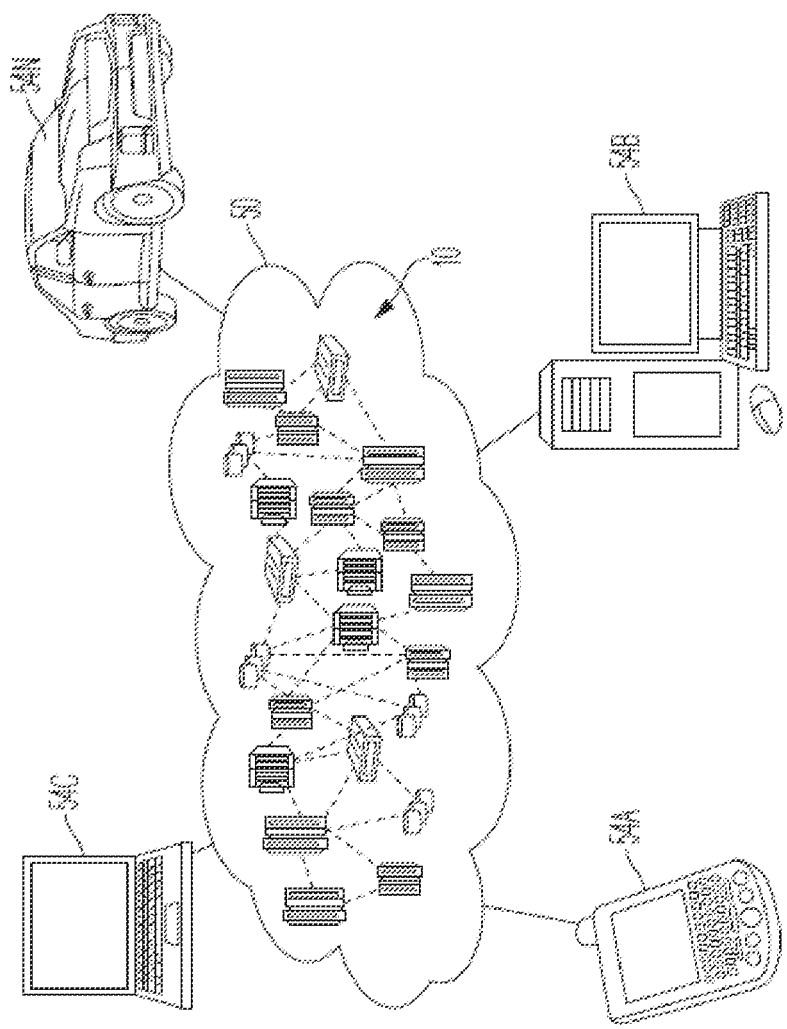
FIG. 9 depicts a cloud computing environment according to one or more embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
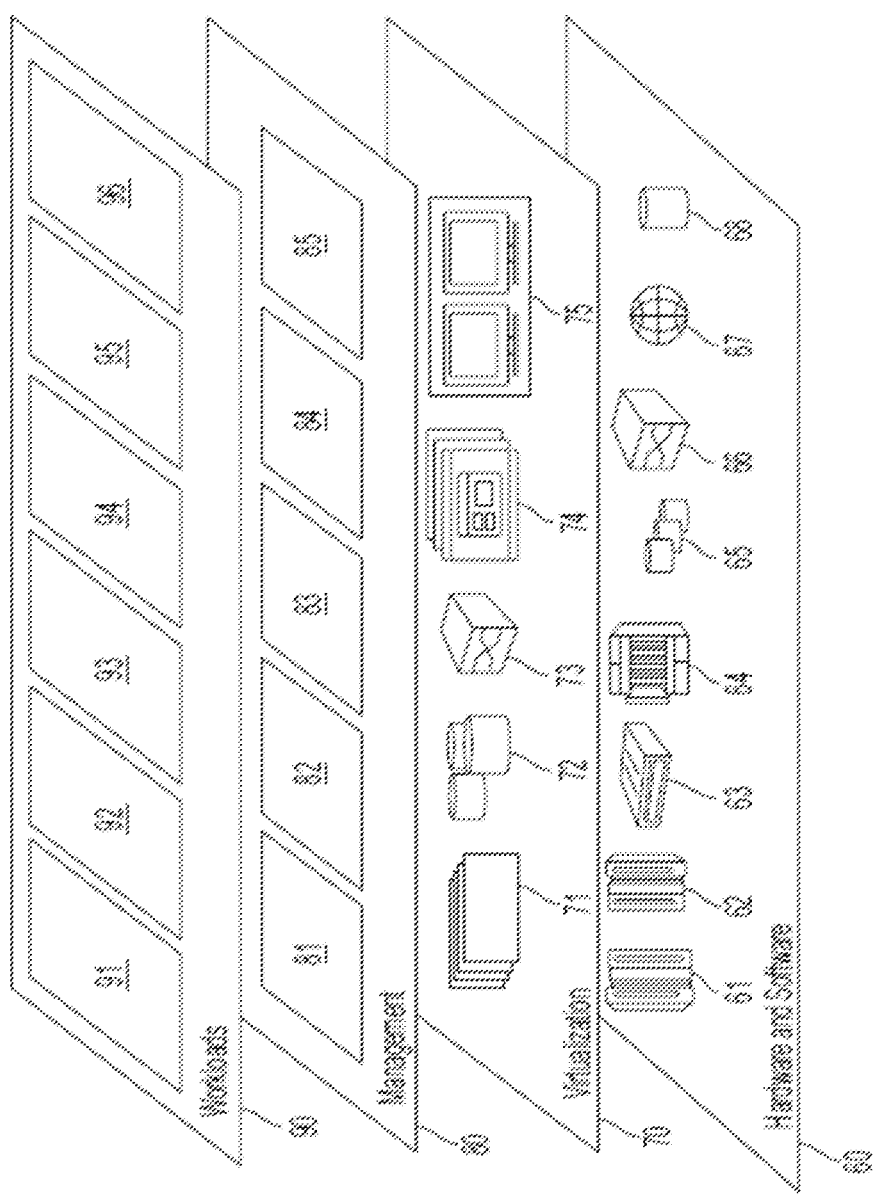
FIG. 10 depicts abstraction model layers according to one or more embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 206 of FIG. 2), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving a first message log entry comprising a message identifier and message field data;
   pre-processing the first message log entry to determine the message identifier and to tokenize the message field data;
   identifying a second message log entry based on at least one of the message identifier and the tokenized message field data;
   determining that the second message log entry is correlated with the first message log entry, wherein determining the correlation comprises a word-by-word comparison of each token in the first message log against one or more predetermined keywords having predetermined message relationship logical contexts; and
   providing an output comprising the message correlation between the first message log entry and the second message log entry.

2. The computer-implemented method of claim 1, wherein determining that the second message log entry is correlated with the first message log entry comprises determining that the second message log entry co-occurs with the first message log entry.

3. The computer-implemented method of claim 1, further comprising determining a type of correlation between the first message log entry and the second message log entry.

4. The computer-implemented method of claim 3, wherein determining the type of correlation comprises identifying a temporal relationship between the first message log entry and the second message log entry.

5. The computer-implemented method of claim 4, wherein identifying the temporal relationship comprises one or more of keyword matching, sequential analysis, and sentence pattern analysis.

6. The computer-implemented method of claim 3, wherein determining the type of correlation comprises identifying a semantic relationship between the first message log entry and the second message log entry.

7. The computer-implemented method of claim 6, wherein identifying the semantic relationship comprises one or more of part of speech (POS) tagging, sentence separation analysis, and distance-based filtering.

8. A system comprising:
   a memory having computer readable instructions; and
   one or more processors for executing the computer readable instructions, the computer readable instructions controlling the one or more processors to perform operations comprising:
      receiving a first message log entry comprising a message identifier and message field data;
      pre-processing the first message log entry to determine the message identifier and to tokenize the message field data;
      identifying a second message log entry based on at least one of the message identifier and the tokenized message field data;
      determining that the second message log entry is correlated with the first message log entry, wherein determining the correlation comprises a word-by-word comparison of each token in the first message log against one or more predetermined keywords having predetermined message relationship logical contexts; and
      providing an output comprising the message correlation between the first message log entry and the second message log entry.

9. The system of claim 8, wherein determining that the second message log entry is correlated with the first message log entry comprises determining that the second message log entry co-occurs with the first message log entry.

10. The system of claim 8 further comprising determining a type of correlation between the first message log entry and the second message log entry.

11. The system of claim 10, wherein determining the type of correlation comprises identifying a temporal relationship between the first message log entry and the second message log entry.

12. The system of claim 11, wherein identifying the temporal relationship comprises one or more of keyword matching, sequential analysis, and sentence pattern analysis.

13. The system of claim 10, wherein determining the type of correlation comprises identifying a semantic relationship between the first message log entry and the second message log entry.

14. The system of claim 13, wherein identifying the semantic relationship comprises one or more of part of speech (POS) tagging, sentence separation analysis, and distance-based filtering.

15. A computer program product comprising a computer readable storage medium having program instructions embodied therewith, the program instructions executable by a processor to cause the processor to perform operations comprising:
   receiving a first message log entry comprising a message identifier and message field data;

pre-processing the first message log entry to determine the message identifier and to tokenize the message field data;

identifying a second message log entry based on at least one of the message identifier and the tokenized message field data;

determining that the second message log entry is correlated with the first message log entry, wherein determining the correlation comprises a word-by-word comparison of each token in the first message log against one or more predetermined keywords having predetermined message relationship logical contexts; and providing an output comprising the message correlation between the first message log entry and the second message log entry.

16. The computer program product of claim 15, wherein determining that the second message log entry is correlated with the first message log entry comprises determining that the second message log entry co-occurs with the first message log entry.

17. The computer program product of claim 15 further comprising determining a type of correlation between the first message log entry and the second message log entry.

18. The computer program product of claim 17, wherein determining the type of correlation comprises identifying a temporal relationship between the first message log entry and the second message log entry.

19. The computer program product of claim 18, wherein identifying the temporal relationship comprises one or more of keyword matching, sequential analysis, and sentence pattern analysis.

20. The computer program product of claim 17, wherein determining the type of correlation comprises identifying a semantic relationship between the first message log entry and the second message log entry.

* * * * *